(12) United States Patent
Goodall et al.

(10) Patent No.: US 7,524,912 B2
(45) Date of Patent: Apr. 28, 2009

(54) PREPARATION OF LINEAR ETHYLENE-ACRYLATE COPOLYMERS WITH PALLADIUM CATALYSTS AND FREE RADICAL SCAVENGERS

(75) Inventors: Brian Leslie Goodall, Seattle, WA (US); Thomas Cleveland Kirk, Ivyland, PA (US); Lester Howard McIntosh, III, Green Lane, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/069,769

(22) Filed: Feb. 13, 2008

(65) Prior Publication Data

US 2008/0207856 A1     Aug. 28, 2008

Related U.S. Application Data

(60) Provisional application No. 60/904,128, filed on Feb. 28, 2007.

(51) Int. Cl.
| | |
|---|---|
| C07D 207/00 | (2006.01) |
| C07D 221/00 | (2006.01) |
| C07D 207/46 | (2006.01) |
| C08F 4/72 | (2006.01) |
| C08F 220/14 | (2006.01) |
| C07C 15/16 | (2006.01) |

(52) U.S. Cl. .................. 526/348; 526/90; 526/135; 526/145; 526/193; 526/204; 526/217; 526/220; 526/236; 526/280; 526/281; 526/317.1; 526/319; 526/320; 526/172; 502/162; 502/168; 502/217

(58) Field of Classification Search .............. 526/90, 526/135, 145, 172, 193, 204, 217, 220, 236, 526/280, 281, 317.1, 319, 320, 348

See application file for complete search history.

(56) References Cited

U.S. PATENT DOCUMENTS

| | | | | |
|---|---|---|---|---|
| 4,698,403 | A | | 10/1987 | Klabunde |
| 4,716,138 | A | * | 12/1987 | Murray ................ 502/117 |
| H889 | H | * | 2/1991 | Kluttz ................ 524/96 |
| 5,744,560 | A | * | 4/1998 | Foucher et al. ............. 526/221 |
| 5,760,286 | A | * | 6/1998 | Brandvold ............. 562/35 |
| 7,087,687 | B2 | * | 8/2006 | Goodall et al. ........... 526/117 |
| 7,339,075 | B2 | * | 3/2008 | Allen et al. ............. 562/35 |
| 2004/0171774 | A1 | | 9/2004 | Rieger et al. |
| 2007/0049712 | A1 | | 3/2007 | Allen et al. |
| 2007/0287627 | A1 | | 12/2007 | Allen et al. |
| 2007/0287847 | A1 | | 12/2007 | Allen et al. |
| 2008/0207789 | A1 | * | 8/2008 | Acholla et al. .......... 521/144 |

FOREIGN PATENT DOCUMENTS

| | | | |
|---|---|---|---|
| GB | 2 159826 A | | 12/1985 |
| WO | WO 0002890 | * | 1/2000 |
| WO | WO 0006615 | * | 2/2000 |

OTHER PUBLICATIONS

Lecomte et al., "Controlled Radical Polymerization of Methyl Methacrylate in the Presence of Palladium Acetate, Triphenylphosphine, and Carbon Tetrachloride", Macromol. 1997, 30, 7630-7633.*

Ittel et al., "Late-Metal Catalysts for Ethylene Homo- and Copolymerization", Chem. Rev. 2000, 100, 1169-1203.*

L. B. Levy, "The Inhibition of Butyl Acrylate by p-Methoxyphenol", Journal of Applied Polymer Science 1996, 60, 2481-2487.

J. Heinemann et al, "Copolymerization of ethene with methyl acrylate and ethyl 10-undecenoate using a cationic palladium diimine catalyst", Macomol.Chem.Phys.200 1999, 384-389.

M Baumert, et al "Highly branched polyethylene graft copolymers prepared by means of migratory insertion polymerization . . . ",Macromol, Rapid Commun.2000,21,271-276.

G.Tian et al, "Neutral Paladium Complexes As Catalysts for Olefin-Methyl Acrylate Copolymerization:A Cautionary Tale", Macromolecules 2001,34,7656-7663.

E.Drent et al, "Palladium catalysed copolymerisation of ethene with alkylacrylates: polar comonomer built into the linear polymer chain",Chem.Commu.2002,744-745.

C.Elia et al, "Palladium-Based System for the Polymerization of Acrylates. Scope and Mechanism", Organometallics 2002, 21, 4249-4256.

(Continued)

*Primary Examiner*—David R Sample
*Assistant Examiner*—Richard A Huhn
(74) *Attorney, Agent, or Firm*—Richard R. Clikeman; Thomas S. Deibert

(57) ABSTRACT

A polymerizable composition including a late transition metal complex, a non-polar olefin, a polar olefin, and a free radical scavenger, wherein the polymerizable composition is capable of forming a linear poly[(non-polar olefin)-(polar olefin)] substantially free of free radical addition polymer, is disclosed. A method of copolymerizing a non-polar olefin with a polar olefin, catalyzed by a late transition metal complex in the presence of a free radical scavenger, to produce a linear poly[(non-polar olefin)-(polar olefin)] substantially free of free radical addition polymer is also disclosed.

10 Claims, No Drawings

OTHER PUBLICATIONS

L. Zakharov et al, "Metal-Mediated Polymerization of Acrylates: Relevance of Radical Traps?",Macromolecules 2004, 37 ,9305-9307.

R. Lopez, et al, "Functionalized Polyethylenes as Controlling Agents for . . . ", Proceeding of 8th Polymers Advanced Technologies Int'l Symposium,Budapest Hungary,13-16 Sep. 2005.

K.M. Skupov, et al, "Catalytic Copolymerization of Ethylene and Norbornene in Emulsion", Macromolecules 2006, 39, 4279-4281.

E.F. McCord, et al, "13C NMR Analysis of a-Olefin Enchainment in Poly(a-olefins) Produced with Nickel and Palladium a-Diimine Catalysts",Macromolecules2007,pub Web Jan. 6, 2007.

* cited by examiner

PREPARATION OF LINEAR ETHYLENE-ACRYLATE COPOLYMERS WITH PALLADIUM CATALYSTS AND FREE RADICAL SCAVENGERS

This application claims the benefit of priority under 35 U.S.C. §119(e) of Provisional Patent Application No. 60/904,128 filed on Feb. 28, 2007.

This invention was made with United States Government support under ATP Award No. 70NANB4H3014 awarded by the National Institute of Standards and Technology (NIST). The United States Government has certain rights in the invention.

The present invention relates to a polymerizable composition including a late transition metal complex, a non-polar olefin, a polar olefin, and a free radical scavenger, wherein the polymerizable composition is capable of forming a linear poly[(non-polar olefin)-(polar olefin)] substantially free of free radical addition polymer. The present invention also relates to a method of copolymerizing a non-polar olefin with a polar olefin to produce a linear poly[(non-polar olefin)-(polar olefin)] substantially free of free radical addition polymer.

There remains an industry wide need for new catalyst complexes that are capable of polymerizing polar monomers in a controlled fashion and for copolymerizing polar monomers with olefins (e.g., ethylene, propylene) under mild reaction conditions. Of the many approaches to modifying the properties of a polymer, the incorporation of functional groups into an otherwise non-polar material would be ideal in many situations. The incorporation of polar groups into a non-polar material can result in modification to various physical properties of the resultant copolymer, for example, toughness, adhesion, barrier properties and surface properties. Changes in these physical properties can result in improved solvent resistance, miscibility with other polymers and rheological properties, and product performance such as paintability, dyeability, printability, gloss, hardness and mar resistance.

Many organometallic complexes useful as catalysts for polymerization of non-polar olefins are incapable of polymerizing polar olefins when those polar olefins are included in reaction mixtures. In reaction mixtures including both non-polar and polar olefins and utilizing certain other organometallic complexes as catalyst, poly(non-polar olefin)s are formed and poly(polar olefin)s are formed, but desired poly(polar olefin)-co-(non-polar olefin)s are not produced. Novak and co-workers, Macromolecules 2001, 34, 7656-7663, investigated neutral palladium complexes bearing pyrroleimine ligands, finding that such complexes catalyze the homopolymerization of methyl acrylate in high yield (>95%). Novak further noted that copolymerization of methyl acrylate with norbornene or 1-hexene in the presence of these catalysts appeared to produce acrylate-enriched copolymers. Further investigation revealed, however, that a stable organic free radical, galvinoxyl, was able to inhibit all polymerization (i.e., homopolymerization and copolymerization) under the anaerobic conditions utilized for the polymerization, causing Novak to conclude that the neutral complexes were inducing free radical polymerization rather than catalyzing coordination polymerization. Novak wrote: "Collectively, all of our mechanistic studies support a free radical mechanism for MA polymerization using neutral palladium complexes". Johnson, Wang, and McCord (WO01/92354 A2) found that homopolymerization of acrylate monomers to form free radical addition homopolymers was a severe problem during polymerization of non-polar olefins with acrylates to form branched coordination addition copolymers. Their solution to the problem was to limit acrylate monomers employed to a very few that are not readily susceptible to free radical addition polymerization. In spite of vigorous and prolonged attempts, preparation of linear copolymers of non-polar olefins and polar monomers has eluded practitioners. An exception is found in the work of Drent, et al., Chem. Commun., 2002, 744-745. Unfortunately, Drent's copolymer contained substantial amounts of free radical addition homopolymer formed from the polar monomer.

There exists a need for a catalytic composition capable of catalyzing the polymerization of non-polar olefins and polar olefins to produce linear copolymers including, as polymerized units, both non-polar olefins and polar olefins, wherein the copolymer is a coordination addition copolymer free, or substantially free, of free radical addition polymer. There also exists a need for such a catalytic composition that is further capable of producing linear, or linear, coordination addition copolymers including, as polymerized units, both non-polar olefins and polar olefins.

We have surprisingly discovered that a late transition metal complex capable of catalyzing the coordination addition polymerization of a non-polar olefin with a polar olefin to form a linear poly[(non-polar olefin)-(polar olefin)] will form that linear poly[(non-polar olefin)-(polar olefin)] substantially free of free radical addition polymer when the polymerization is carried out in the presence of a free radical scavenger. The linear poly[(non-polar olefin)-(polar olefin)] thus formed is obtained substantially free of free radical addition polymer without recourse to any purification procedure.

One aspect of the present invention is directed to a polymerizable composition including:
A. a catalytic composition including an organometallic complex;
B. non-polar olefin;
C. a polar olefin monomer; and
D. a free radical scavenger,
wherein the organometallic complex includes a metal center, M, complexed with at least one ligand, wherein the at least one ligand has a structure according to Formula (I)

wherein M is selected from Ni and Pd;
wherein $X^1$, $X^2$ and $X^3$ are independently selected from a hydrocarbyl group, an aromatic hydrocarbyl group and derivatives thereof;
wherein Q is selected from phosphorus and arsenic; and
wherein $R^{15}$ is selected from $-SO_3$, $-PO_3$, $-AsO_3$, and $-C(CF_3)_2O$;
wherein the catalytic composition is a catalytic composition that produces, by coordination addition polymerization of the acyclic aliphatic olefin monomer and the polar monomer, a linear poly[(non-polar olefin)-(polar olefin)] including, as polymerized units, the acyclic aliphatic olefin monomer and the polar monomer;
wherein the linear poly[(non-polar olefin)-(polar olefin)] has a branch content of 0.0 to no more than 15 branches/1,000 carbon atoms, as determined by Carbon 13 NMR of the copolymer; and
wherein the free radical scavenger is present in an amount sufficient to suppress the formation of a free radical polymer such that the amount of the free radical polymer formed is 0.0 percent by weight to no more than 1.0 percent by weight, based on the weight of the linear poly[(non-polar olefin)-(polar olefin)].

A second aspect of the present invention is directed to the polymerizable composition of the first aspect, wherein the free radical scavenger is a stable organic free radical.

A third aspect of the present invention is directed to a method of forming the linear poly[(non-polar olefin)-(polar olefin)] of the first aspect, including the steps of:

A. forming the polymerizable composition of claim 1 by combining:
  i. a catalytic composition including an organometallic complex;
  ii. a non-polar olefin;
  iii. a polar olefin; and
  iv. a free radical scavenger,
  wherein the organometallic complex includes a metal center, M, complexed with at least one ligand, wherein the at least one ligand has a structure according to Formula (I)

wherein M is selected from Ni and Pd;
  wherein $X^1$, $X^2$ and $X^3$ are independently selected from a hydrocarbyl group, an aromatic hydrocarbyl group and derivatives thereof;
  wherein Q is selected from phosphorus and arsenic; and
  wherein $R^{15}$ is selected from —$SO_3$, —$PO_3$, —$AsO_3$, and —$C(CF_3)_2O$;
  wherein the catalytic composition is a catalytic composition that produces, by coordination addition polymerization of the acyclic aliphatic olefin monomer and the polar monomer, a linear poly[(non-polar olefin)-(polar olefin)] including, as polymerized units, the non-polar olefin and the polar olefin; and
  wherein the free radical scavenger is present in an amount sufficient to suppress the formation of a free radical polymer such that the amount of the free radical polymer formed is 0.0 percent by weight to no more than 1.0 percent by weight, based on the weight of the linear poly[(non-polar olefin)-(polar olefin)]; and B. polymerizing the non-polar olefin and the polar olefin to form a polymerized composition including the linear poly[(non-polar olefin)-(polar olefin)] having a branch content of at least 0.0 to no more than 15 branches/1,000 carbon atoms, as determined by Carbon 13 NMR, wherein the polymerized composition includes free radical addition polymer in an amount of from 0.0 to no more than 1.0 percent by weight based on the weight of the linear poly[(non-polar olefin)-(polar olefin)].

A fourth aspect of the present invention is directed to a polymerized composition including:

A. a linear poly[(non-polar olefin)-(polar olefin)] including, as polymerized units, a non-polar olefin and a polar olefin;

B. a catalytic composition including an organometallic complex;

wherein the organometallic complex includes a metal center, M, complexed with at least one ligand, wherein the at least one ligand has a structure according to Formula (I)

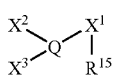

wherein M is selected from Ni and Pd;
  wherein $X^1$, $X^2$ and $X^3$ are independently selected from a hydrocarbyl group, an aromatic hydrocarbyl group and derivatives thereof;
  wherein Q is selected from phosphorus and arsenic; and
  wherein $R^{15}$ is selected from —$SO_3$, —$PO_3$, —$AsO_3$, and —$C(CF_3)_2O$;

C. a free radical scavenger,
  wherein the polymerized composition includes a free radical addition polymer in an amount of 0.0 percent by weight to no more than 1.0 percent by weight, based on the weight of the linear poly[(non-polar olefin)-(polar olefin)];
  wherein the catalytic composition is a catalytic composition that produces, by coordination addition polymerization of non-polar monomer and the polar monomer, a linear poly[(non-polar olefin)-(polar olefin)] including, as polymerized units, the acyclic aliphatic olefin monomer and the polar monomer; and
  wherein the linear poly[(non-polar olefin)-(polar olefin)] has a branch content of 0.0 to no more than 15 branches/1,000 carbon atoms, as determined by Carbon 13 NMR.

The terminology of this specification includes words specifically mentioned herein, derivatives thereof, and words of similar import.

Used herein, the following terms have these definitions:

The words "a" and "an" as used in the specification mean "at least one", unless otherwise specifically stated.

"Range". Disclosures of ranges herein take the form of lower and upper limits. There may be one or more lower limits and, independently, one or more upper limits. A given range is defined by selecting one lower limit and one upper limit. The selected lower and upper limits then define the boundaries of that particular range. All ranges that can be defined in this way are inclusive and combinable, meaning that any lower limit may be combined with any upper limit to delineate a range.

The term "ethylenically unsaturated monomer" refers to a molecule having one or more carbon-carbon double bonds, and capable of coordination polymerization. The term "monoethylenically unsaturated monomer" refers to an ethylenically unsaturated monomer having one carbon-carbon double bond capable of coordination polymerization.

The term "non-polar olefinic monomer" (alternatively "non-polar olefin") refers to an ethylenically unsaturated monomer consisting exclusively of hydrogen and carbon atoms. The non-polar olefinic monomers of the present invention are any non-polar olefinic monomers capable of being polymerized using the catalytic component of the present invention to form a "linear poly[(non-polar olefin)-(polar olefin)]".

The term "polar olefinic monomer" (alternatively "polar olefin") refers to an ethylenically unsaturated monomer including at least one atom other than carbon or hydrogen. The polar olefin of the present invention is any polar olefin capable of being polymerized, in combination with a non-polar olefin of the present invention, using the catalytic component of the present invention to form a "linear poly[(non-polar olefin)-(polar olefin)]".

An "addition polymer" is a polymer capable of being prepared by addition polymerization, and selected from the group consisting of poly(non-polar olefin), poly(polar olefin), poly[(polar olefin)-(non-polar olefin)], and combinations thereof.

A "poly(non-polar olefin)" is a polymer including one or more non-polar olefinic monomers, as polymerized units. As such, a "poly(non-polar olefin)" may be a homopolymer or a copolymer, and the copolymer may be, for example, a random copolymer A "poly(polar olefin)" is a polymer including, as polymerized units, one or more polar olefinic monomers. As such, a "poly(polar olefin)" may be a homopolymer or a copolymer, and the copolymer may be, for example, a random copolymer.

A "poly[(non-polar olefin)-(polar olefin)]" is a copolymer including one or more non-polar olefinic monomers and one or more polar olefinic monomers, as polymerized units, and the copolymer may be, for example, a random copolymer.

It will be recognized that, herein, the term poly(non-polar olefin) may refer to a homopolymer containing, as polymerized units, a single non-polar olefin, or alternatively may refer to a copolymer containing, as polymerized units, two or more non-polar olefins. It will further be recognized that the term poly[(non-polar olefin)-(polar olefin)] may refer to a copolymer containing, as polymerized units, a single non-polar olefin and a single polar olefin, or alternatively may refer to a copolymer containing, as polymerized units, two or more of either or both of non-polar olefin and one polar olefin.

A "polymer" includes, as polymerized units, one or more monomers. A polymer may be a "homopolymer" or a "copolymer". A "homopolymer" includes, as polymerized units, a single monomer (i.e., plural polymerized units of one specific polymerizable chemical compound are incorporated into the polymer chain). Examples of a homopolymer are poly(methyl acrylate) ("p-MA") and polyethylene. A "copolymer" includes, as polymerized units, two or more monomers (i.e., polymerized units of two or more specific polymerizable chemical compounds are incorporated into the polymer chain). An example of a copolymer is poly(ethylene-co-methyl acrylate).

"Coordination addition polymerization" ("coordination polymerization"; "insertion addition polymerization") describes a polymerization process catalyzed by an organometallic complex, wherein catalysis is accomplished by the coordination of a growing polymer chain to the metal of the organometallic complex, wherein the growth of the polymer chain is accomplished by insertion of a monomer between the metal and the terminal carbon of the growing polymer chain. A carbon of the newly inserted monomer then becomes coordinated to the metal as the new terminal carbon of the extended polymer chain.

A "coordination addition polymer" ("coordination polymer") is a polymer formed by coordination addition polymerization.

A "free radical initiator" is a chemical compound capable of forming a free radical, or is a moiety bearing a free radical, wherein a free radical is an unpaired electron capable of attacking a carbon-carbon double bond of an ethylenically unsaturated monomer, thereby forming a covalent bond at one carbon of what had been the carbon-carbon double bond and creating a new free radical at the other carbon. The growing radical polymer chain thus formed propagates by attacking a carbon-carbon double bond of another ethylenically unsaturated monomer, or terminates by reacting with a free radical borne by, or abstractable from, another moiety in the polymerization mixture, to form a covalent bond A "free radical addition polymer" ("free radical polymer") is a polymer formed by free radical initiated polymerization.

A "free radical scavenger" is chemical compound, or other chemical moiety, capable of interacting with a free radical to eliminate that free radical through the formation of a covalent bond, or to otherwise render that free radical inactive.

An "oxygen enabled free radical scavenger" is a free radical scavenger which is capable of scavenging free radicals when oxygen in present, but is incapable of acting as a free radical scavenger in the absence of oxygen. An oxygen enabled free radical scavenger is capable of inhibiting free radical initiated polymerization, in the presence of molecular oxygen or compounds, including compounds derived from an ethylenically unsaturated monomer, which contain active oxygen moieties. An oxygen enabled free radical scavenger is, therefore, capable of inhibiting free radical initiated polymerization in the presence of molecular oxygen or compounds containing active oxygen moieties.

A "stable organic free radical" (also referred to herein as an "anaerobically active free radical scavenger" is a free radical scavenger which is an organic free radical compound, or other moiety, capable of effectively inhibiting the free radical initiated polymerization of unsaturated monomers, even in the absence of molecular oxygen or compounds, including compounds derived from an ethylenically unsaturated monomer, which contain active oxygen moieties. A stable organic free radical is capable of inhibiting free radical initiated polymerization, and thereby preventing the formation of a free radical addition polymer.

The term "ppm" means "parts per million" which, in turn, means "weight parts per million weight parts". "Parts per million" is a weight based measure. Therefore, the amount of a given component x in a composition y is calculated by dividing the weight of component x by the weight of composition y and then multiplying by one million. For example, if 0.002 gram of a stable organic free radical is present in a polymerizable composition containing 1000 grams of a polar monomer, the stable organic free radical is present at 2 ppm, based on the total weight of the polar monomer.

Molecular Weight. Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

where:

$M_i$=molar mass of $i^{th}$ component of distribution
$W_i$=weight of $i^{th}$ component of distribution
$N_i$=number of chains of $i^{th}$ component and the summations are over all the components in the distribution. $M_w$ and $M_n$ are typically computed from the MWD as measured by Gel Permeation Chromatography (see the Experimental Section). The "MWD polydispersity" is equal to $M_w/M_n$.

The oxygen enabled free radical scavenger of the present invention may be any chemical compound or chemical moiety capable of inhibiting a free radical in the presence of oxygen but incapable of doing so in the absence of oxygen. Oxygen enabled free radical scavengers include, for example, aromatic monohydroxy compounds shielded by bulky groups, such as phenols which have at least one bulky group in a vicinal position relative to the OH group. The oxygen enabled free radical scavengers are disclosed in U.S. Pat. No. 4,360,617. Suitable phenolic compounds include, for example, alkylphenols, hydroxyphenylpropionates, aminophenols, bisphenols, and alkylidenebisphenols. A further group of suitable phenols is derived from substituted benzocarboxylic acids, in particular from substituted benzopropionic acids.

Examples of stearically hindered phenols are bis(2,6-tert-butyl)-4-methylphenol ("BHT"), 4-methoxymethyl-2,6-di-tert-butylphenol, 2,6-di-tert-butyl-4-hydroxymethylphenol, 1,3,5-trimethyl-2,4,6-tris(3,5-di-tert-butyl-4-hydroxybenzyl)-benzene, 4,4'-methylenebis(2,6-di-tert-butylphenol), 2,4-di-tert-butylphenyl 3,5-di-tert-butyl-4-hydroxybenzoate, 2,2-bis(4-hydroxyphenylpropane (bisphenol A), 4,4'-dihydroxybiphenyl ("DOD"), 2,2'-methylenebis(4-methyl-6-tert-butylphenol), 1,6-hexanediol bis-3-(3,5-di-tert-butyl-4-hydroxyphenyl)propionate), octadecyl 3-(3,5-bis(tert-butyl)-4-hydroxyphenyl)propionate, 3,5-di-tert-butyl-4-hydroxybenzyldimethylamine, 2,6,6-trioxy-1-phosphabicyclo(2.2.2)oct-4-ylmethyl 3,5-ditert-butyl-4-hydroxyhydrocinnamate, and N,N'-hexamethylenebis-3,5-di-tert-butyl-4-hydroxyhydrocinnamide. A group of suitable stearically hindered phenols includes bis(2,6-(C1-C10-alkyl)-4-(C1-C10-alkyl)phenols. Another set of suitable stearically hindered phenols includes bis(2,6-tert-butyl)-4-methylphenol and bis(2,6-methyl)-4-methylphenol. A suitable stearically hindered phenol is bis(2,6-tert-butyl)-4-methylphenol.

The stable organic free radicals of the present invention are, typically, "delocalized free radicals" or "persistent free radicals". A "delocalized free radical" is an organic free radical that participates in a conjugated π-electron system. An example of such a delocalized free radical is that derived from α-tocopherol (vitamin E). The extent of delocalization in these system varies from extensive to slight. In fact, there are many heterocyclic thiazyl radicals which show remarkable kinetic and thermodynamic stability, yet display π resonance stabilization (i.e., delocalization) to only a limited extent [Oakley, R. T. Prog. Inorg. Chem. 1998, 36, 299; Banister, A. J., et al. Adv. Hetero. Chem. 1995, 62, 137].

"Persistent free radicals" derive their stability from steric crowding around the radical center, crowding which makes it physically difficult for the free radical to react with another molecule. Examples of persistent free radicals include Gomberg's radical (triphenylmethyl), Fremy's salt (Potassium nitrosodisulfonate, $(KSO_3)_2NO\cdot$), hindered nitroxides having the general formula $R_2NO\cdot$, such as TEMPO, verdazyls, nitronyl nitroxides, and azephenylenyls.

Illustrative examples of suitable delocalized free radicals of the present invention include delocalized free radicals having structures according to Formula I:

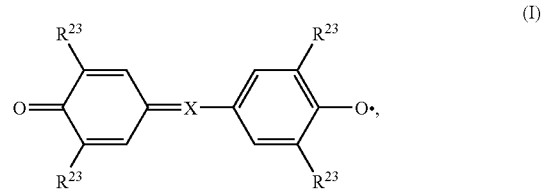

wherein each $R^{23}$ is, independently, a tertiary alkyl group having 4 to 7 carbon atoms and X is CH or N. Illustrative tertiary alkyl groups include t-butyl and 3-ethyl-3-pentyl. Illustrative examples of delocalized free radicals represented by Formula I include: galvinoxyl, wherein $R^{23}$ is t-butyl and X is CH; azagalvinoxyl, wherein $R^{23}$ is t-butyl and X is N; and combinations thereof. One of skill in the art will recognize that Formula I is a representation of the actual molecular structure of galvinoxyl, azagalvinoxyl, and related delocalized free radicals. The actual molecular structure of the free radical is a hybrid structure in which the unpaired electron is delocalized over the molecule. It should be understood, therefore, that Formula I is a convenient shorthand way to represent the molecular structure of this type of delocalized free radical.

Suitable persistent free radicals include "sterically hindered nitroxyl free radicals" (interchangeably referred to as: "sterically hindered N-oxyl free radical") having structures according to Formula II:

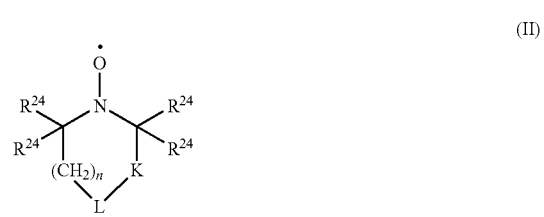

wherein K is selected from $CH_2$ and O; wherein L is selected from $CH_2$, C=O, CHOH, $CHOP(=O)(OH)_2$, CHOC(=O) $R^{25}$ where $R^{25}$ is selected from C1-C20 linear, branched, or cyclic alkyl, and $CHR^{26}$ where $R^{26}$ is a polymer chain fragment; wherein n=0 or 1; and wherein each $R^{24}$ is independently selected from: C1-C20 linear, branched, or cyclic alkyl; substituted C1-C20 alkyl; phenyl; substituted phenyl; and a polymer chain fragment. Suitable sterically hindered N-oxly free radicals having structures according to Formula II are further those structures wherein K is $CH_2$; wherein L is selected from $CH_2$, C=O, CHOH, and $CHOP(=O)(OH)_2$; wherein n=0 or 1; and wherein each $R^{24}$ is independently selected from: methyl and phenyl; phenyl; or methyl. Suitable sterically hindered N-oxly free radicals having structures according to Formula II are still further those structures wherein K is $CH_2$; wherein L is $CH_2$; wherein n=0 or 1; and wherein each $R^{24}$ is methyl. A suitable sterically hindered N-oxly free radical having a structure according to Formula II is further a structure wherein K is $CH_2$; wherein L is $CH_2$; wherein n=1; and wherein each $R^{24}$ is methyl.

Illustrative examples of suitable sterically hindered N-oxyl free radicals include: 2,2,6,6-tetraalkyl-1-piperidin-N-oxyl free radicals such as 2,2,6,6-tetramethyl-1-piperidin-N-oxyl free radical ("TEMPO"), 4-oxo-2,2,6,6-tetramethyl-1-piperidin-N-oxyl free radical ("4-oxo-TEMPO"), 4-hydroxy-2,2,6,6-tetramethyl-1-piperidin-N-oxyl free radical ("4-hydroxy-TEMPO"), 4-phosphonoxy-2,2,6,6-tetramethyl-1-piperidin-N-oxyl free radical ("4-phosphonoxy-TEMPO"), and esters of 4-hydroxy-TEMPO; 2,6-dialkyl-2,6-diaryl-1-piperidin-N-oxyl free radicals such as 2,6-dimethyl-2,6-diphenyl-1-piperidin-N-oxyl free radical; bis-(alicyclic-N-oxyl)diradicals ("bis-TEMPO"s) such as bis(1-oxyl-2,2,6,6-tetramethylpiperidin-4-yl)sebacate; 2,2,5,5-tetraalkyl-1-pyrrolidin-N-oxyl free radicals such as 2,2,5,5-tetramethyl-1-pyrrolidin-N-oxyl free radical ("PROXYL") and 3-carboxy-2,2,5,5-tetramethyl-1pyrrolidin-N-oxyl free radical; 2,5-dialkyl-2,5-diaryl-1-pyrrolidin-N-oxyl free radicals such as 2,5-dimethyl-2,5-diphenyl-1-pyrrolidin-N-oxyl free radical; di-alkyl nitroxides such as di-tert-butyl nitroxyl free radical; polymer-bound TEMPOs; 2,2,5,5-tetramethyl-3-oxazolidinyloxyl free radical; all-tertiary butyl N oxyl; and metal complexes with TEMPOs. Suitable hindered N-oxyl free radicals may further be selected from: bis-TEMPO, oxo-TEMPO, hydroxy-TEMPO, an ester of hydroxy-TEMPO, polymer-bound TEMPO, PROXYL, DOXYL, di-tert-butyl nitroxyl free radical, 2,5-dimethyl-2,5-diphenyl-1-pyrrolidin-N-oxyl free radical, 4-phosphonoxy-TEMPO, a metal complex with TEMPO, and combinations thereof. Suitable hindered N-oxyl free radicals may still further be selected from: bis-TEMPO, 4-hydroxy-TEMPO, and combinations thereof. Sterically hindered N-oxyl free radicals may be used individually or in combination with other stable organic free free radicals.

The free radical scavenger of the present invention is used in the polymerizable composition of the present invention in an amount of at least 1, at least 2, at least 5, or at least 10 ppm; and no more than 1000, no more than 200, no more than 100, or no more than 50 ppm, based on the weight of polar olefin. A stable organic free radical may be utilized as the free radical scavenger in either the presence or absence of molecular oxygen or compounds which contain active oxygen moieties. The stable organic free radical of the present invention is used in an amount of at least 1, at least 2, at least 5, or at least 10 ppm; and no more than 1000, no more than 200, no more than 100, or no more than 50 ppm, based on the weight of polar olefin used in the polymerization. It is further possible to use concentrations of stable organic free radicals which are twice, three times or even four times the concentration of the transition metal compound in the polymerization mixture. In the presence of molecular oxygen or compounds which contain active oxygen moieties, the oxygen enabled free radical scavenger of the present invention is used in an amount of at least 1, at least 2, at least 5, or at least 10 ppm; and no more than 1000, no more than 200, no more than 100, or no more than 50 ppm, based on the weight of polar olefin. When molecular oxygen or compounds which contain active oxygen moieties are present in the polymerizable composition of the present invention a stable organic free radical and an oxygen enabled free radical scavenger may further be used in combination.

A "catalytic component" includes an "organometallic complex" capable of copolymering a non-polar olefin and a polar olefin to produce a poly[(non-polar olefin)-(polar olefin)]. The "organometallic complex" includes a metal center, M, complexed with at least one ligand, wherein the at least one ligand has a structure according to Formula (III)

(III)

wherein M is selected from Ni and Pd;
wherein $X^1$, $X^2$ and $X^3$ are independently selected from a hydrocarbyl group, an aromatic hydrocarbyl group and derivatives thereof;
wherein Q is selected from phosphorus and arsenic; and
wherein $R^{15}$ is selected from $—SO_3$, $—PO_3$, $—AsO_3$, and $—C(CF_3)_2O$.

In some embodiments of the present invention, the catalyst component is prepared as a discrete organometallic complex according to Formula IV

(IV)

wherein j=1 or 2; i=0 or 1; and j+i=2; wherein $R^{22}$ is selected from H and a hydrocarbyl radical; preferably $R^{22}$ is selected from H, a $C_{1-20}$ cyclic hydrocarbyl radical and a $C_{1-20}$ aliphatic hydrocarbyl radical; wherein L is a labile neutral electron donor ligand; and, wherein Q is selected from phosphorus and arsenic; wherein M is selected from Ni and Pd; wherein $R^{15}$ is selected from $—SO_3$, $—PO_3$, $—AsO_3$, and $—C(CF_3)_2O$; wherein $X^1$, $X^2$ and $X^3$ are as described supra; with the proviso that when j=2; i=0 and each $R^{15}$ is bound to both metal centers, M. In some aspects of these embodiments, L is selected from pyridine; substituted pyridines; nitrile (e.g., acetonitrile); substituted nitrile; ammonia; alkyl amines; substituted alkyl amines; aryl amines; substituted aryl amines; water; alkyl phosphines; substituted alkyl phosphines; aryl phosphines; substituted aryl phosphines; alkyl phosphites; substituted alkyl phosphites; aryl phosphites; substituted aryl phosphites; cyclic olefins (e.g., cyclooctadiene, cyclooctatetraene, norbornadiene and dicyclopentadiene); substituted cyclic olefins; aliphatic ethers; substituted aliphatic ethers; cyclic ethers; substituted cyclic ethers; acetates; substituted acetates; ketones and substituted ketones. In some aspects of these embodiments, L is selected from pyridine, substituted pyridines and ammonia. In some aspects of these embodiments, L is selected from pyridine and substituted pyridines.

Suitable organometallic complexes of the present invention may further have L selected from pyridine, substituted pyridines, and ammonia. A suitable metal atom, M, is a late transition metal selected from: Pd, Ni, Co, and Fe; Pd and Ni; Pd; and Ni. Suitable organometallic complexes are further neutral late transition metal complexes.

The term "labile neutral electron donor ligand" as used herein and in the appended claims refers to any ligand that is not strongly bound to the metal center, M, such that it is easily displaced from the metal center; and when separated from the metal center in its closed shell electron configuration exhibits a neutral charge.

Suitable catalytic components may further include an "activator component" capable of removing, or partially removing, a labile neutral electron donor ligand, L, from the metal atom, M, of the organometallic complex. Activator components useful in the present invention include organic borane compounds and inorganic borane compounds. Non-limiting examples of boron containing activator components of the present invention are trifluoroborane, triphenylborane, tris(4-fluorophenyl)borane, tris(3,5-difluorophenyl)borane, tris(4-fluoromethylphenyl)borane, tris(pentafluorophenyl) borane, tris(tolyl)borane, tris(3,5-dimethylphenyl)borane, tris(3,5-difluorophenyl)borane, tris(3,4,5-trifluorophenyl) borane. Both stoichiometric and non-stoichiometric quantities of activator components are usefully employed. Chemically and structurally useful boron compounds would be apparent to those skilled in the art based on their respective chemical structures and activities in olefin polymerizations. In the method of the present invention, the activator component is present in an amount of: at least 0.1 molar equivalent, at least 0.3 molar equivalent, at least 0.7 molar equivalent, or at least 1.0 molar equivalent, based on leaving group Y; and no more than 5,000 molar equivalent, no more than 500 molar equivalent, no more than 5 molar equivalent, or no more than 2 molar equivalents, based on leaving group Y.

A "branched coordination addition polymer" ("branched coordination polymer") is a polymer prepared by coordination polymerization, wherein the branched coordination polymer has more than 15 branches/1,000 carbon atoms, as determined by Carbon 13 NMR. A branched coordination polymer may be a branched poly(non-polar olefin), a branched poly[(non-polar olefin)-(polar olefin)], or a combination thereof. If produced at all, a branched coordination polymer produced from non-polar olefin and/or the polar olefin is a "branched coordination polymer". The definition of "linear poly[(non-polar olefin)-(polar olefin)]" used herein does not include a first branched coordination polymer.

A "free radical addition polymer" ("free radical polymer") is a polymer prepared by free radical polymerization. A free radical polymer may be a poly(non-polar olefin), a poly(polar olefin), a poly[(non-polar olefin)-(polar olefin)], or a combination thereof. If produced at all, a free radical polymer produced from first monomer is a "first free radical polymer". The definition of "linear poly[(non-polar olefin)-(polar olefin)]" used herein does not include a free radical polymer.

Non-limiting examples of the organometallic complex of the catalytic component of the present invention include: discrete organometallic complexes according to Formula IV, wherein the organometallic complexes are monometallic, such as

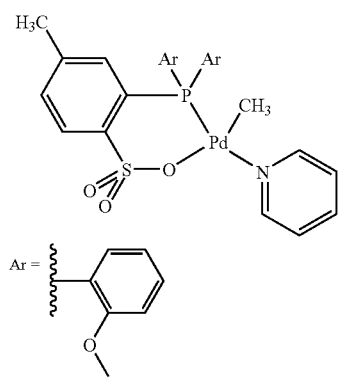

$j=1$, $i=1$; M=Pd; $R^{22}$=CH$_3$; L=NC$_5$H$_5$; Q=p; $X^2$=$X^3$=Ar;

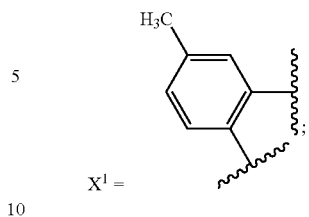

$R^{15}$=—SO$_3$; and discrete organometallic complexes according to Formula IV, wherein the organometallic complexes are dimmers including two metal centers, such as

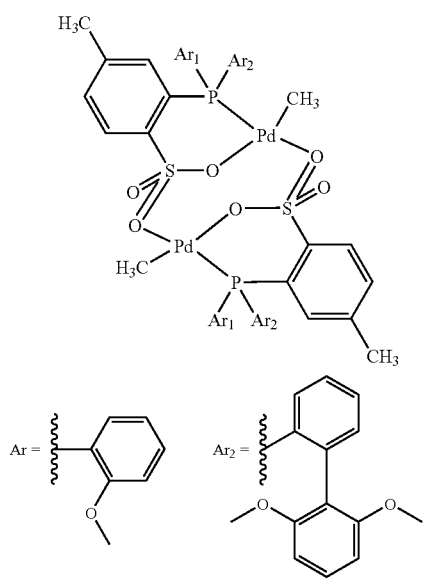

$j=2$, $i=0$; M=Pd; $R^{22}$=CH$_3$; Q=P; $X^2$=Ar$_1$; $X^3$=Ar$_2$;

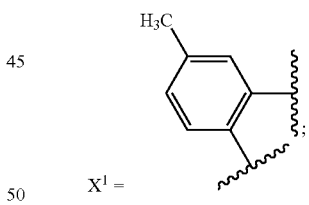

$R^{15}$=—SO$_3$.

The non-polar olefin of the present invention is selected from ethylene, a $C_2$-$C_{20}$ acyclic aliphatic olefin, and combinations thereof. A suitable non-polar olefin may further be ethylene.

A non-polar olefin of the present invention may further be a non-polar norbornene-type monomer, with the proviso that the non-polar norbornene-type monomer is polymerized with other non-polar monomers to form a poly(non-polar olefin) and that the non-polar norbornene-type monomer is not polymerized with a polar olefin. The term "non-polar norbornene-type monomer", as used herein, encompasses norbornenes and higher cyclic derivatives of norbornene that are substituted with a non-polar substituent selected from: $C_1$-$C_{20}$ alkyl group, aryl group, alkaryl group, and combinations thereof.

The polar olefin of the present invention is represented by Formula V

wherein Z is selected from an aromatic hydrocarbyl group, —OY, —COY and —CO$_2$Y; where Y is selected from hydrogen and R$^{19}$; where R$^{19}$ is selected from a hydrocarbyl group, an aromatic hydrocarbyl group and derivatives thereof.

The polar olefin of the present invention may be an acrylate monomer. Acrylate monomers include, for example: C$_1$-C$_{22}$ linear or branched chain alkyl acrylates, bornyl acrylate, and isobornyl acrylate; hydroxyethyl acrylate, hydroxypropyl acrylate; epoxy containing acrylates such as glycidyl acrylate; acrylic acid; styrene or substituted styrenes; butadiene.

Suitable fluorinated acrylic monomers useful in the present invention include, but are not limited to: fluoroalkyl acrylate; fluoroalkylpropyl acrylate; ω-H-perfluoroalkanediol diacrylate; and β-substituted fluoroalkyl acrylate. The fluoroalkyl groups used as substituents have from 1 to 20 carbon atoms and the fluoroalkyl groups may be mono-, di, tri, or tetra-fluorinated, or contain any number of fluoro-atoms, up to and including perfluorinated compositions.

The polar olefin of the present invention may be a vinyl ether monomer. An illustrative, non-exhaustive list of vinyl ethers includes: methyl vinyl ether, ethyl vinyl ether, propyl vinyl ether, isopropyl vinyl ether, n-butyl vinyl ether, 2-ethylhexyl vinyl ether, stearyl vinyl ether, 3-(ethenyloxy)-1-propanol, 1,4-butanediol monovinyl ether, 2-methoxyethyl vinyl ether, triethylene glycol vinyl ether, 2-(hydroxyethoxy)ethyl vinyl ether, 3,6,9,12,15-pentaoxaheptadec-1-ene, octadecanoic acid 4-(ethenyloxy)butyl ester, trifluoroethyl vinyl ether, cyclohexyl vinyl ether, 2-[(ethenyloxy)methoxy]-2-methyl-tricyclo[3.3.1.13.7]decane, 2-methyl-4-(vinyloxymethyl)-1,3-dioxolane, 2-(vinyloxy)tetrahydropyran, 2-morpholinoethyl vinyl ether, 5-(ethenyloxy)-1,3-benzenediol, 4-(ethenyloxy)-1,2-benzenedicarbonitrile, 4-(ethenyloxy)-benzenesulfonamide, 2-(ethenyloxy)-benzenesulfonamide, 2-(ethenyloxy)-benzenemethanol, 4-(ethenyloxy)-pyridine, p-cumenyl vinyl ether, phenyl vinyl ether diethyl-phosphoramidous acid divinyl ester, 2,5-bis[[4-(ethenyloxy)butyl]amino]-2,5-cyclohexadiene-1,4-dione, and 9-[2-[2-(ethenyloxy)ethoxy]ethyl]-9H-carbazole.

The polar olefin of the present invention may also be a vinyl ketone monomer. An illustrative, non-exhaustive list of vinyl ketones includes: 1-pentadecen-3-one, 1-hepten-3-one, 1-decen-3-one, 3-buten-2-one, 1-nonadecen-3-one, 1-octen-3-one, 1-hepten-3-one, 1-hexen-3-one, 1-penten-3-one, and 1-phenyl-2-propen-1-one.

The first polar monomer of the present invention may further be an N-vinyl monomer having Formula (VI):

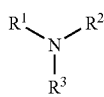

wherein
R$^1$ is selected from —C═C, and —C(O)—C═C;
R$^2$ and R$^3$ are independently selected from H, an alkyl group, an alkenyl group, an alkynyl group, an aryl group, a biphenyl group, a carboxylate group, a carboxyalkyl group, a carboxyarylalkyl group, an alkoxy group, an alkenyloxy group, an alkynyloxy group, an aryloxy group, an alkoxycarbonyl group, and derivatives thereof;
wherein R$^2$ and R$^3$ may optionally be combined to form a cyclic or multi-cyclic structure;
with the proviso that R$^2$ and R$^3$ are not both H and with the proviso that the first monomer according to Formula IV is not N-vinylimidazole.

Suitable N-vinyl monomers having Formula VI have R$^2$ and R$^3$ equal to H, a C$_{1-20}$ alkyl group, a C$_{2-20}$ alkenyl group, a C$_{2-20}$ alkynyl group, an aryl group, a biphenyl group, a C$_{1-20}$ carboxylate group, a C$_{1-20}$ carboxyalkyl group, a C$_{1-20}$ carboxyarylalkyl group, a C$_{1-20}$ alkoxy group, a C$_{2-20}$ alkenyloxy group, a C$_{2-20}$ alkynyloxy group, an aryloxy group, a C$_{2-20}$ alkoxycarbonyl group, and derivatives thereof. Further suitable N-vinyl monomers having Formula VI have and R$^3$ equal to H, a C$_{1-20}$ alkyl group and a C$_{1-20}$ carboxyalkyl group; alternatively H and a C$_{1-20}$ alkyl group.

Other suitable N-vinyl monomers having Formula VI have R$^1$ equal to —C═C, and R$^2$ and R$^3$ combine to form a cyclic or multi-cyclic structure. In one aspect of that suitable N-vinyl monomer, the N-vinyl monomer is selected from N-vinyldihydrocarbylamines. In another aspect, the N-vinyl monomer according to Formula VI is selected from N-vinylcarbazole and N-vinylphthalimide.

Yet other suitable N-vinyl monomers having Formula VI have R$^1$ equal to —C═C; R$^2$ is a carboxyalkyl group, alternatively a C$_{1-20}$ carboxyalkyl group, alternatively a C$_{1-3}$ carboxyalkyl group; and R$^3$ is an alkyl group, alternatively a C$_{1-20}$ alkyl group; alternatively a C$_{1-3}$ alkyl group. In some aspects of these other suitable N-vinyl monomers, R$^2$ and R$^3$ may optionally be combined to form a cyclic or multi-cyclic structure. In some aspects, the monomer according to Formula VI is selected from vinylacetamides. In some aspects, the monomer according to Formula VI is selected from N-vinylpyrrolidone, N-methylvinylacetamide and N-vinylcaprolactam.

Still other suitable N-vinyl monomers having Formula VI have R$^1$ equal to —C(O)—C═C. In some aspects of these embodiments, the at least one monomer according to Formula VI is an acrylamide.

Suitable N-vinyl monomers having Formula IV may further be selected from N-vinylformamide; N-vinylacetamide; N-vinylphthalimide; N-methylvinylacetamide; N-vinylcaprolactam; 5-ethyl-5-methyl-3-vinylhydantoin; N-vinylpyrrolidone; 5-methyl-5-phenyl-3-vinylhydantoin; N-vinylcarbazole; N,N-dimethyl acrylamide; and 5-pentamethylene-3-vinylhydantoin.

The polar olefin of the present invention may be a polar norbornene-type monomer. The term "polar norbornene-type monomer", as used herein, encompasses norbornenes and higher cyclic derivatives of norbornene that are substituted with a polar group. A suitable polar norbornene-type monomer may be a monomer including a norbornene structure and at least one functional group containing an oxygen atom. An illustrative, non-exhaustive, list of polar norbornene-type monomers is shown below:

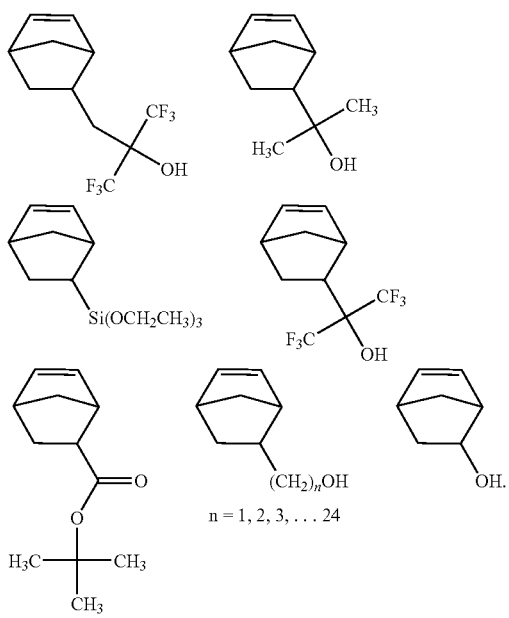

A suitable ligand having the structure according to formula III:

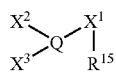

is a structure according to formula VII:

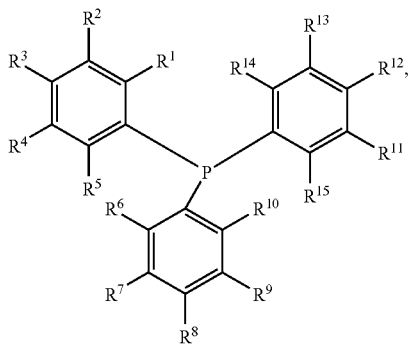

wherein $R^1$-$R^{14}$ are independently selected from a hydrogen; a halogen; and, a substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof; wherein $R^{15}$ is selected from: —$SO_3$, —$SO_2N(R^{18})$, —$CO_2$, —$PO_3$, —$AsO_3$, —$SiO_2$, —$C(CF_3)_2O$; —$SO_3$ and —$SO_2N(R^{18})$; —$SO_3$; or —$SO_2N(R^{18})$; wherein $R^{18}$ is selected from a hydrogen; a halogen; and, a substituted or unsubstituted substituent selected from $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof.

A suitable ligand having the structure according to formula VII may further be a ligand wherein none of $R^1$, $R^5$, $R^6$ and $R^{10}$ is selected from $CH_3$, $CF_3$, F, $SMe_2$, biphenyl and phenoxy.

A suitable ligand having the structure according to formula VII may be a ligand wherein two or more adjacent R groups selected from $R^1$-$R^5$ may be linked to form a substituted or unsubstituted, saturated or unsaturated ring structure.

A suitable ligand having the structure according to formula VII may be a ligand wherein two or more adjacent R groups selected from $R^6$-$R^{10}$ may be linked to form a substituted or unsubstituted, saturated or unsaturated ring structure.

A suitable ligand having the structure according to formula VII may be a ligand wherein two or more adjacent R groups selected from $R^{11}$-$R^{14}$ may be linked to form a substituted or unsubstituted, saturated or unsaturated ring structure.

A suitable ligand having the structure according to formula VII may be a ligand wherein: at least one of $R^1$, $R^5$, $R^6$ and $R^{10}$ is selected from a phenyl and a derivative thereof; at least one of $R^1$, $R^5$, $R^6$ and $R^{10}$ is an ortho substituted phenyl; at least one of $R^1$, $R^5$, $R^6$ and $R^{10}$ is an ortho substituted phenyl, wherein the ortho substituted phenyl is 2,6-$R^{16}$,$R^{17}$-phenyl, wherein $R^{16}$ and $R^{17}$ are independently selected from hydrogen, halogen, $C_1$-$C_{20}$ alkyl, $C_3$-$C_{20}$ cycloalkyl, $C_2$-$C_{20}$ alkenyl, $C_2$-$C_{20}$ alkynyl, aryl, arylalkyl, alkylaryl, phenyl, biphenyl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl, $C_1$-$C_{20}$ alkylsulfinyl, silyl and derivatives thereof. In the ligand having the structure according to formula C, the derivatives of the foregoing groups may include such groups optionally substituted with hydrocarbyl and/or heteroatom substituents selected from linear or branched $C_1$-$C_5$ alkyl, linear or branched $C_1$-$C_5$ haloalkyl, linear or branched $C_2$-$C_5$ alkenyl and haloalkenyl, halogen, sulfur, oxygen, nitrogen, phosphorus and phenyl, optionally substituted with linear or branched $C_1$-$C_5$ alkyl, linear or branched $C_1$-$C_5$ haloalkyl and halogen. In the ligand having the structure according to formula C: the cycloalkyl and cycloalkenyl groups may be monocyclic or multicyclic; the aryl groups may include a single ring (e.g., phenyl) or a fused ring system (e.g., naphthyl, anthracenyl); the cycloalkyl, cycloalkenyl and aryl groups may be taken together to form a fused ring system; each of the monocyclic and multicyclic ring systems may optionally be monosubstituted or multisubstituted with a substituent independently selected from hydrogen, linear and branched $C_1$-$C_5$ alkyl, linear and branched $C_1$-$C_5$ haloalkyl, linear and branched $C_1$-$C_5$ alkoxy, chlorine, fluorine, iodine, bromine, $C_5$-$C_{10}$ cycloalkyl, $C_6$-$C_{15}$ cycloalkenyl and $C_6$-$C_{30}$ aryl.

A ligand having the structure according to formula VII may suitably have at least one of $R^1$, $R^5$, $R^6$ and $R^{10}$ which is 2,6-dimethoxy phenyl.

Ligands having structures according to the general structural formulae III and VII are made according to preparative procedures disclosed in U.S. patent application Ser. Nos. 11/457,982 and 11/457,996.

A suitable ligand having the structure according to formula VII is further selected from Structures I-XV presented in Table 1. A suitable ligand may further have a structure selected from Structures I, XI, and XIV. A suitable ligand may still further have a structure selected from Structures I and XIV. A suitable ligand may yet further have a structure which is Structure I. A suitable ligand may further have a structure which is Structure XIV.

TABLE 1

Examples of ligands having general structure VII.

| Structure Number | Ligand Chemical Name | Ligand Structure |
|---|---|---|
| I | 2-(bis(2',6'dimethoxy-2-biphenyl)phosphino)benzene sulfonic acid | |
| II | 2-(bis(2-ethylphenyl)phosphino)benzene sulfonic acid | |
| III | 2-(bis(4-dimethylaminophenyl)phosphino benzene sulfonic acid | |
| IV | 2-(bis(2-methoxyphenyl)phosphino)napthalene sulfonic acid | |
| V | 2-(bis(2-naphthalenyl)phosphino)benzene sulfonic acid | |

TABLE 1-continued

Examples of ligands having general structure VII.

| Structure Number | Ligand Chemical Name | Ligand Structure |
|---|---|---|
| VI | 2-(bis(dicyclopentadienyl-iron)phosphine)benzene sulfonic acid | |
| VII | 2-(bis(2',4',6'-trimethoxyphenyl)phosphino)benzene sulfonic acid | |
| VIII | 2-(bis(2',4'-dimethoxyphenyl)phosphino)benzene sulfonic acid | |
| IX | 2-(bis(mesityl)phosphino)benzene sulfonic acid | |

TABLE 1-continued

Examples of ligands having general structure VII.

| Structure Number | Ligand Chemical Name | Ligand Structure |
|---|---|---|
| X | 2-(bis(mesityl)phosphino)napthalene sulfonic acid | |
| XI | 2-(bis(2-biphenyl)phosphino)benzene sulfonic acid | |
| XII | 2-(bis(3,5-di-t-butyl-phenyl)phosphino)benzene sulfonic acid | |
| XIII | 2-(bis(2',6'dimethoxy-2-biphenyl)phosphino)benzoic acid | |
| XIV | 2-(bis(2-methoxy-phenyl)-phosphanyl)-4-nitro-benzenesulfonic acid | |
| XV | 2-Dicyclohexylphosphanyl-benzenesulfonic acid | |

Organometallic complexes including at least one ligand having a structure according to the general structural formulae III and VII are made according to preparative procedures disclosed in U.S. patent application Ser. No. 11/457,969.

The poly[(non-polar olefin)-(polar olefin)] of the present invention is a copolymer that is "linear". The term "linear" is used herein to indicate that the branch content of the copolymer is: at least 0.0, at least 0.5, or at least 1 branch/1,000 carbon atoms; and no more than 15, no more than 10, or no more than 5 branches/1,000 carbon atoms. In some aspects the invention, the branches contain at least two carbon atoms. Other suitable poly[(non-polar olefin)-(polar olefin)]s may include one or more branches having a single carbon atom. The branching content of the poly[(non-polar olefin)-(polar olefin)] is determined by Carbon 13 NMR of the copolymer.

A suitable linear poly[(non-polar olefin)-(polar olefin)] of the present invention is a random copolymer.

The linear poly[(non-polar olefin)-(polar olefin)] of the present invention has a number average molecular weight, $M_n$, which is: at least 5,000, at least 10,000, at least 21,200, at least 24,000, at least 25,000, at least 40,000, at least 50,000, at least 70,000, at least 95,000, at least 150,000, or at least 250,000 g/mole; and no more than 5,000,000, no more than 2,000,000, no more than 1,000,000, no more than 800,000, or no more than 500,000 g/mole. It will be further recognized by one of skill in the art that, while the foregoing lower and upper limits for the number average molecular weight, $M_n$, just enumerated will typically be achieved by the polymerization reaction of the present invention, copolymers having $M_n$ greater than 5,000,000 g/mole may, in some instances, be realized.

The linear "poly[(non-polar olefin)-(polar olefin)]" of the present invention is any polymer that can be made from at least one of the non-polar olefins and at least one of the polar olefins of the present invention. The following is short, non-exhaustive, list of illustrative examples of the linear poly [(non-polar olefin)-(polar olefin)]: poly[ethylene-co-methyl acrylate], poly[octene-co-methyl acrylate], poly[propylene-co-methyl acrylate], poly[norbornene-co-methyl acrylate]. In fact, the poly[(non-polar olefin)-(polar olefin)] may include, as polymerized units, any non-polar olefin and any polar olefin capable of coordination polymerization in the presence of the organometallic complex of the present invention, provided that the poly[(non-polar olefin)-(polar olefin)] is linear. The molar ratio of non-polar olefin to polar olefin, present as polymerized units in the linear poly[(non-polar olefin)-(polar olefin)] of the present invention is: at least 80:20, at least 95:5, at least 90:10, or at least 95:5 mol/mol; and no more than 99.95:0.05, no more than 99.8:0.2, no more than 99.5:0.5, or no more than 98:2 mol/mol. The weight average molecular weight, $M_w$, of the linear polymer is: at least 500, at least 1,000, at least 10,000, or at least 20,000; and no more than 5,000,000, no more than 1,000,000, no more than 200,000 grams/mole of first linear polymer. The number average molecular weight, $M_n$, of the linear polymer is: at least 500, at least 1,000, at least 10,000, or at least 20,000; and no more than 5,000,000, no more than 1,000,000, no more than 200,000 grams/mole of first linear polymer. The polydispersity of the molecular weight distribution (MWD), equal to $M_w/M_n$ is: at least 1.00, at least 1.01, or at least 1.1, and no more than 10, no more than 3.0, no more than 1.5, or no more than 1.3. It is further recognized that the molecular weight distribution can be unimodal or multimodal (e.g., bimodal, trimodal). When the molecular weight distribution is multimodal, the polydispersity of the individual modes is: at least 1.00, at least 1.01, or at least 1.1, and no more than 10, no more than 3.0, no more than 1.5, or no more than 1.3.

The polymerizable composition of the present invention is formed by combining: a catalytic composition including a late transition organometallic complex; a non-polar olefin; a polar olefin; and a free radical scavenger, wherein the organometallic complex includes a metal M and a ligand, M is a late transition metal selected from Ni, Pd, Co, and Fe, and the catalytic composition is a catalytic composition that produces, by coordination addition polymerization of the acyclic aliphatic olefin monomer and the polar monomer, a linear poly[(non-polar olefin)-(polar olefin)] including, as polymerized units, the non-polar olefin monomer and the polar monomer; and wherein the free radical scavenger is present in an amount sufficient to suppress the formation of a free radical polymer such that the amount of the free radical polymer formed is 0.0 percent by weight to no more than 1.0 percent by weight, based on the weight of the linear poly[(non-polar olefin)-(polar olefin)]. (polar olefin)]. When the polymerizable composition is free of molecular oxygen, the free radical scavenger will be a stable organic free radical. When the polymerizable composition contains molecular oxygen, the free radical scavenger may be either a stable organic free radical or an oxygen enabled free radical scavenger.

The method of preparing the linear poly[(non-polar olefin)-(polar olefin)] of the present invention can be carried out at a reaction temperature (° C.) of: at least 30, at least 50, or at least 60° C.; and no more than 150, no more than 120, no more than 100° C. The pressure for the polymerization will vary according to catalyst component activity and non-polar olefin and polar olefin chosen. Typically, gaseous monomers such as ethylene require elevated pressures. Polymerization pressures are: at least 0.01, at least 0.10, at least 0.50, or at least 1.0 atmospheres; and no more than 1,000, no more than 100, no more than 10, or no more than 5 atmosphere.

Further, the molar ratio of ethylenically unsaturated monomer to the organometallic complex of present invention is: at least 50:1, at least 200:1, at least 250:1, or at least 1,000:1, and no more than 5,000,000:1, no more than 2,000,000:1, or no more than 500,000:1, no more than 250,000:1, or no more than 100,000:1. For gaseous monomers at high pressures, in particular constant high pressures, e.g., equal to or greater than 400 psi, the molar ratio of ethylenically unsaturated monomer to the organometallic complex of present invention may be even higher than 5,000,000:1, for example, no more than 6,000,000:1, no more than 8,000,000:1, or even higher. In the method of polymerization of the present invention, the amount of diluent, expressed as volume (milliliters) of diluent per millimole of the organometallic complex of the present invention, is: at least 0.0, at least 10, at least 50, or at least 100; and no more than 10,000,000, no more than 1,000,000, no more than 100,000, no more than 10,000, or no more than 5,000.

Some embodiments of the present invention will now be described in detail in the following Examples. All fractions and percentages set forth below in the Examples are by weight unless otherwise specified. The chemical structures presented in Table 1 have been drawn according to the general rules for drawing Lewis structures of molecules as described in, for example, Brown, et al., *Organic Chemistry*, Brooks-Cole, 4th ed 2004. Chemicals and used in the Examples are listed in Table A.

TABLE A

Listing of chemicals used in the examples.

| Chemical Name | Abbreviation | CAS No. | Supplier |
|---|---|---|---|
| Methyl Acrylate | MA | 96-33-3 | Aldrich |
| 4-hydroxy-2,2,6,6-tetramethyl-1-piperidin-N-oxyl radical | 4-Hydroxy TEMPO | 2226-96-2 | Aldrich |
| activated molecular sieves 4A | | 70955-01-0 | Aldrich |
| Q-5 oxygen scavenger | | 1344-28-1 1317-38-0 | Labclear |
| Inhibitor Removal Resin for MEHQ | | 9003-70-7 | Aldrich |
| 4-Hydroxy anisole | MEHQ | 150-76-5 | Aldrich |
| ethylene | E | 74-85-1 | Matheson |

Molecular Weight Determination using Gel Permeation Chromatography (GPC). Gel Permeation Chromatography, otherwise known as size exclusion chromatography, separates the members of a distribution according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p. 81-84.

Procedure for High Temperature Gel Permeation Chromatography (HTGPC) analysis of polymer samples. The HTGPC molecular weight data, rounded to the nearest thousand, is summarized in Table 2.

Sample preparation: The polymer sample was prepared at a concentration of ~2 mg/mL in trichlorobenzene (TCB) (HPLC grade). The mixture of polymer sample and TCB, contained in a vial, was shaken overnight at 140° C., to dissolve the polymer. The polymer solution was then filtered through a 2 µm filtration cartridge from PL.

GPC separation procedure: GPC separation, using HPLC grade TCB as elution solvent, was performed at 140° C. using 2 PL gel Mixed B LS columns and refractive index detector.

Chromatographic Conditions:
Columns: 2 PL gel MIXED B LS columns (300×7.5 mm ID)+guard column (50×7.5 mm ID), particle size 10 µm
Column Temperature: 140° C.
Eluent: TCB (HPLC grade), 1.0 ml/min flow rate at 140° C.
Sample solvent: TCB
Injection volume of sample solution: 100 µL
Detector: RI ($T_N$=140° C.)
Standards: poly(styrene) standards (Red, Yellow, Green EasiVial pre-weighed mixes) having M in the range 580 to 6,035,000 g/mol with C approximately 2.0 mg/mL in TCB were used to construct an 11 point calibration curve (linear) which was used to evaluate the relative M of the analyzed samples.

Determination of copolymer composition using nuclear magnetic resonance (NMR) spectroscopy. The samples were dissolved in deuterated di-chloro-benzene at 138 degree-C. The 1H NMR spectra were acquired on Varian 600 MHz NMR spectrometer at 110 degree-C. The MA —OCH3 proton (~3.60 ppm) and ethylene —CH2-CH2-protons (~1.30 ppm) were integrated and used to calculate polymer composition. The integrals for ethylene was obtained by subtracting out the integrals for MA backbone protons.

Determination of degree of branching of copolymers. Carbon nuclear magnetic resonance ($^{13}C$ NMR) spectroscopic procedure for determining the branch content of polymer. The samples were dissolved in deuterated di-chloro-benzene at 138° C. The $^{13}C$ NMR spectra were acquired on Bruker AVACE400 (100.6 MHz) NMR spectrometer at 110° C. with 45° flip angle and 10 sec recycle delay time. Further disclosure of the this method may be found in using McCord, et al., Macromolecules, published on Web Jan. 6, 2007.

Monomer purification and inhibition methods: Preparation of Distilled Methyl Acrylate. Methyl Acrylate (Aldrich Chemical Company) was purified by initially sparging with dry nitrogen for 15 minutes followed by high vacuum distillation under nitrogen at 35 to 40° C. A small portion of 4-hydroxy-TEMPO was added to the distillation flask before heating to prevent polymerization of the monomer. The initial 25% by volume of collected material was discarded as a forerun cut. The next 50% of the distillate was collected in a receiver cooled to below −50° C. with a dry ice/acetone bath. The distilled monomer was transferred into small vials in a dry box, and the vials were stored under nitrogen in a freezer until used.

General polymerization procedures. The polymerization reactions of Comparative (Example) 1 and Examples 1-7 were set up within a dry box under a nitrogen atmosphere. Nitrogen was purified by passage through columns containing activated molecular sieves and Q-5 oxygen scavenger. Toluene was purified by passage through columns of activated molecular sieves (4 μm)/alumina/O2 remover (e.g., Q-5). The concentration of organometallic complex, catalyst 111D, was 2.0 micromoles/1 ml of polar olefin, methyl acrylate.

Catalyst is 111D (see below) 1.63 milligrams (2 micromoles) per reaction in all cases.

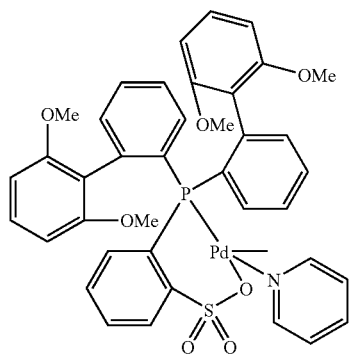

Comparative 1. Copolymer of Ethylene with Methyl Acrylate (Distilled Methyl Acrylate). Distilled methyl acrylate (1 ml) was charged to a glass liner (12 ml total available volume) contained in a sealed stainless steel pressure reactor. Mechanical stirring was begun, and 3.5 ml of toluene was then added by syringe, followed by pressurization to 400 psig with ethylene. The reaction vessel was heated to 80° C. under constant pressure, and a solution of catalyst 111D in 1.0 ml of toluene was added by syringe, followed by a rinse of 0.5 ml of toluene also added by syringe. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.37 grams) was collected in a 1 oz vial.

EXAMPLE 1

Copolymer of Ethylene with Methyl Acrylate (Distilled Methyl Acrylate inhibited with 100 PPM (w/w) added 4-Hydroxy-TEMPO). Distilled methyl acrylate (1 ml) to which 0.01 milligrams of 4-hydroxy TEMPO had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80° C. under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.29 grams) was collected in a 1 oz vial.

EXAMPLE 2

Copolymer of Ethylene with Methyl Acrylate (Distilled Methyl Acrylate inhibited with 1000 ppm (w/w) 4-Hydroxy-TEMPO). Distilled methyl acrylate (1 ml) to which 0.1 milligrams of 4-Hydroxy TEMPO had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80 C under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.29 grams) was collected in a 1 oz vial.

EXAMPLE 3

Copolymer of Ethylene with Methyl Acrylate (Distilled Methyl Acrylate inhibited with 10,000 PPM (w/w) 4-Hydroxy-TEMPO). Distilled methyl acrylate (1 ml) to which 1.0 milligrams of 4-Hydroxy TEMPO had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80 C under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.47 grams) was collected in a 1 oz vial.

EXAMPLE 4

Copolymer of Ethylene with Methyl Acrylate (Distilled Methyl Acrylate with 100 ppm (w/w) Galvinoxyl). Distilled methyl acrylate (1 ml) to which 0.01 milligrams of Galvinoxyl had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80° C. under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.48 grams) was collected in a 1 oz vial.

EXAMPLE 5

Copolymer of Ethylene with Methyl Acrylate (Distilled Methyl Acrylate with 1000 ppm (w/w) Galvinoxyl). Distilled methyl acrylate (1 ml) to which 0.1 milligrams of Galvinoxyl had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80 C under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight The dried polymer product (0.39 grams) was collected in a 1 oz vial.

EXAMPLE 6

Copolymer of Ethylene with Methyl Acrylate (Distilled Methyl Acrylate with 10,000 ppm (w/w) Galvinoxyl). Distilled methyl acrylate (1 ml) to which 1.0 milligrams of Galvinoxyl had been added was charged to a glass liner (12 ml total volume) contained in a sealed stainless steel pressure reactor. Mechanical stirring was begun, and 3.5 ml of toluene was then added followed by pressurization to 400 psig with ethylene. The reaction vessel was heated to 80° C. under constant pressure, and a solution of catalyst 111D in 1.0 ml of toluene was added, followed by a rinse of 0.5 ml of toluene. The polymerization was allowed to proceed under these reaction conditions for 1 hour. After this time, the reactor was vented and the contents of the glass liner were added to methanol. After stirring the resultant methanol/toluene mixture overnight, the precipitated polymer was collected by vacuum filtration and washed with methanol. The polymer was dried in a vacuum oven heated to 60° C. overnight. The dried polymer product (0.25 grams) was collected in a 1 oz vial.

TABLE 2

Inhibitors, inhibitor levels and polymer molecular weight data.

| Example | Inhibitor | Amount (mg) | Product (grams) | Mw | Mn | Mw/Mn |
|---|---|---|---|---|---|---|
| Comparative 1 | None | None | 0.37 | 373000 | 152000 | 2.4 |
| Example 1 | 4-HT | 0.01 | 0.29 | 329000 | 134000 | 2.4 |
| Example 2 | 4-HT | 0.1 | 0.29 | 397000 | 196000 | 2.0 |
| Example 3 | 4-HT | 1 | 0.47 | 452000 | 216000 | 2.1 |
| Example 4 | Galvinoxyl | 0.01 | 0.48 | 384000 | 177000 | 2.2 |
| Example 5 | Galvinoxyl | 0.1 | 0.39 | 372000 | 138000 | 2.7 |
| Example 6 | Galvinoxyl | 1 | 0.25 | 321000 | 145000 | 2.2 |

1H NMR Analysis of polymer composition.

| Example | Inhibitor | Amount (mg) | MA Mole % (total) | Ethylene Mole % (total) | % of MA present as homo-polymer |
|---|---|---|---|---|---|
| Comparative 1 | None | None | 3.8 | 96.2 | >80 |
| Example 1 | 4-HT | 0.01 | 1.7 | 98.3 | 65 |
| Example 2 | 4-HT | 0.1 | 0.4 | 99.6 | 0 |
| Example 3 | 4-HT | 1 | 0.3 | 99.7 | 0 |
| Example 4 | Galvinoxyl | 0.01 | 0.4 | 99.6 | 40 |
| Example 5 | Galvinoxyl | 0.1 | 0.6 | 99.4 | 32 |
| Example 6 | Galvinoxyl | 1 | 0.4 | 99.6 | 0 |

EXAMPLE 7

Synthesis of Ligand 132, 2-[(2-methoxyphenyl)(2',6'-dimethoxybiphenyl)phosphino]toluene-sulfonic acid. Magnesium Reagent Plus >99% powder, 50 mesh (0.3 g., 12.3 mmol) was added to a 100 mL flask ("Flask A") then placed under vacuum and refilled with nitrogen and charged with 60 mL of tetrahydrofuran (THF). 2-Bromoanisole (2.18 g., 11.7 mmol) was added to Flask A. The contents in Flask A were allowed to react for 2 hours. Flask A was then placed in a dry ice/acetone bath and allowed to cool to about −78° C.

Toluene Sulfonic Acid (2.22 g., 11.7 mmol) was placed into a separate 100 mL Schlenk flask ("Flask B") and was placed under vacuum. Flask B was purged with nitrogen and charged with ~60 mL of THF. Flask B was then placed in an ice bath and allowed to cool to 0° C. 9.3 mL of 2.5 molar n-Butyl Lithium (n-BuLi) was then injected. Flask B was then placed in a dry ice/acetone bath and allowed to cool to about −78° C. A separate 200 mL Schlenk flask ("Flask C") was placed under vacuum. Flask C was purged with nitrogen and charged with ~50 mL of THF. Phosphorus trichloride ($PCl_3$) (1.02 mL, 11.7 mmol) was then added to Flask C with agitation. Flask C was then placed in a dry ice/acetone bath and allowed to cool to about −78° C. The contents of Flask B were then slowly transferred to Flask C using a cannula with vigorous agitation. The contents in Flask C were allowed to react for 45 min. The contents of Flask A were then slowly transferred to Flask C and the contents of Flask C were slowly warmed up to room temperature. Flask C was then placed in a dry ice/ acetone bath and allowed to cool to about −78° C.

A separate 500 mL flask ("Flask D") was purged and filled with nitrogen. Flask D was then charged with ~150 mL of THF and 2'-Bromo-2,6 dimethoxybiphenyl (3.42 g., 11.7 mmol). Flask D was then placed in a dry ice/acetone bath and allowed to cool with agitation to about −78° C. 4.7 mL of 2.5 molar n-BuLi was added to Flask D and allowed to react for about 15 minutes. The contents of Flask C were then transferred to Flask D, maintained at −78° C., using a cannula with continued vigorous agitation. Following the complete addition of the contents of Flask C into Flask D, Flask D was allowed to warm to room temperature overnight. The contents of Flask D were then poured into a 1000 mL recovery flask (Flask E) and the THF was removed, leaving a solid. The solid in Flask E was then mixed with ~100 mL of distilled water and then transferred to a separation flask (Flask F). 100 mL of Methylene Chloride ($CH_2Cl_2$) was added to the contents of Flask F. Flask F was shaken to mix the two layers. About 20 mL of concentrated HCl was then added to Flask F. Flask F was shaken again. The mixture in Flask F was then allowed to settle, forming two layers—an organic phase on the bottom and an aqueous phase on the top. The organic layer was collected. The aqueous phase was washed with 50 mL of $CH_2Cl_2$. The organic wash material was collected and added to the previously collected organic layer material. The combined organic material was then contacted with Magnesium Sulfate and rotovaped to dryness, leaving a solid. The solid was then washed with THF and diethyl ether to remove impurities. Approximately 1.65 g. of the washed product solid 2-[(2',6'-Dimethoxy-biphenyl-2-yl)-(2-methoxy-phenyl)-phosphanyl]-toluene sulfonic acid was collected by filtration.

EXAMPLE 8

Synthesis of 132 Dimer Catalyst Component, {2-[(2-methoxyphenyl)(2',6'-dimethoxylbiphenyl)phosphino]toluenesulfonic acid}palladium dimer. 0.932 g ligand 132 (from Example 3) was added to ~20 mL of tetrahydrofuran (THF) in a reaction flask with agitation. To the contents of the reaction flask was then added 0.482 g tetramethylethylenediamine palladium (II) with continued agitation. The contents of the reaction flask were then agitated for approximately 1 hour. The product catalyst complex was collected by filtration through a fine porosity frit and washed with THF. The product catalyst complex was then subjected to vacuum to remove the remaining volatiles, leaving 0.482 g of white solid as the reaction product.

EXAMPLE 9

Copolymerization of ethylene and methyl acrylate, catalyzed by 132 Dimer, in toluene. Ethylene and methyl acrylate were copolymerized in toluene solution using 132 dimer catalyst The reaction was carried out in a 2 liter Parr reactor system. Methyl acrylate was obtained from Aldrich and was dried using 3 Å molecular sieves and sparged with nitrogen to remove oxygen. 1000 ppm of 4 hydroxy TEMPO was added to inhibit free radical polymerization. 400 mL of methyl acrylate was charged to an inerted (nitrogen) reactor. HPLC grade toluene obtained from Aldrich was dried using 3 Å molecular sieves and sparged with nitrogen to remove oxygen. 900 mL of toluene were charged to the inerted reactor. The catalyst solution was prepared by dissolving 50 mg of 132 dimer catalyst in 100 mL of dry toluene in a nitrogen atmosphere. The catalyst solution was set aside. The reactor was sealed and heated to 90° C. while simultaneously adding ethylene to a final pressure of 400 psig. The copolymerization was initiated by feeding in the catalyst solution at a rate of about 1 mL/minute. The total catalyst feed time is about 100 minutes. The pressure was maintained at 400 psig by feeding in ethylene equal to the rate of ethylene uptake via the copolymerization. The total reaction time including the feed was 3 hours. The reaction was cooled to room temperature and the reaction slurry was added to 2000 mL of methanol. The poly[(non-polar olefin)-(polar olefin)] produced was filtered and dried in a vacuum oven at 60° C. The final polymer product weighed 61 grams. The final polymer was not in discrete particulate form. The composition of the copolymer was determined by NMR to be 2.1 mole % methyl acrylate (6.2 weight %). The weight average molecular weight by GPC was 182,000 with a polydispersity index of 1.8. No branching (i.e., less than 1 branch per 1,000 carbon atoms) was observed by the C13 method. This example demonstrates that the catalyst composition of the present invention produces linear polymers having low, or no branching.

EXAMPLE 10

Copolymerization of ethylene and methyl acrylate, catalyzed by 132 Dimer, in toluene using an oxygen enabled free radical scavenger in the presence of oxygen. The following experiment is conducted with exposure of the reactants and equipment to air prior to sealing the reaction vessel. Distilled methyl acrylate (1 ml) to which 0.10 milligrams of 4-methoxyphenol is charged to a glass liner (12 ml total volume) contained in a stainless steel pressure reactor. Mechanical stirring is started, and 3.5 ml of reagent grade toluene (used as received) is added, followed by pressurization to 400 psig with ethylene, and the reactor is sealed. The reaction vessel is heated to 80° C. under constant pressure, and a solution of catalyst 111D in 1.0 ml of toluene is added, followed by a rinse of 0.5 ml of toluene. The polymerization is allowed to proceed under these reaction conditions for 1 hour. After this time, the reactor is vented to a fume hood and the contents of the glass liner are added to methanol. The resultant methanol/ toluene mixture is then stirred overnight. The precipitated polymer is then collected by vacuum filtration, followed by washing with methanol. The polymer is then dried in a vacuum oven heated to 60° C. overnight. The dried polymer product is then collected in a 1 oz vial.

We claim:
1. A polymerizable composition comprising:
A. a catalytic composition comprising an organometallic complex;
B. non-polar olefin;
C. a polar olefin monomer; and
D. a free radical scavenger,
wherein the organometallic complex comprises a metal center, M, complexed with at least one ligand, wherein the at least one ligand has a structure according to Formula (III)

wherein M is selected from Ni and Pd;
wherein $X^1$, $X^2$ and $X^3$ are independently selected from a hydrocarbyl group, an aromatic hydrocarbyl group and derivatives thereof;
wherein Q is selected from phosphorus and arsenic; and wherein $R^{15}$ is selected from —$SO_3$, —$PO_3$, —$AsO_3$, and —$C(CF_3)_2O$;

wherein the catalytic composition is a catalytic composition that produces, by coordination addition polymerization of the non-polar olefin monomer and the polar monomer, a linear poly[(non-polar olefin)-(polar olefin)] comprising, as polymerized units, the non-polar olefin monomer and the polar monomer;

wherein the linear poly[(non-polar olefin)-(polar olefin)] has a branch content of 0.0 to no more than 15 branches/1,000 carbon atoms, as determined by Carbon 13 NMR of the copolymer; and wherein the free radical scavenger is present in an amount sufficient to suppress the formation of a free radical polymer such that the amount of the free radical polymer formed is 0.0 percent by weight to no more than 1.0 percent by weight, based on the weight of the linear poly[(non-polar olefin)-(polar olefin)].

2. The polymerizable composition of claim 1, wherein the free radical scavenger is a stable organic free radical.

3. The polymerizable composition of claim 2, wherein the stable organic free radical is selected from:

i. a delocalized free radical according to Formula I:

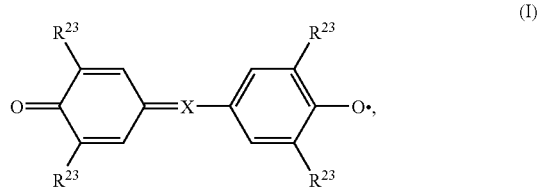

(I)

wherein each $R^{23}$ is, independently, a tertiary alkyl group having 4 to 7 carbon atoms; and wherein X is selected from CH and N;

ii. a sterically hindered N-oxyl free radical according to Formula II:

(II)

wherein K is selected from $CH_2$ and O;

wherein L is selected from $CH_2$, C=O, CHOH, CHOP(=O)(OH)$_2$, CHOC(=O)$R^{25}$ where $R^{25}$ is selected from $C_1$-$C_{20}$ linear, branched, or cyclic alkyl, and CH$R^{26}$ where $R^{26}$ is a polymer chain fragment; and wherein n=0 or 1; and wherein each $R^{24}$ is independently selected from: $C_1$-$C_{20}$ linear, branched, or cyclic alkyl; substituted $C_1$-$C_{20}$ alkyl; phenyl; substituted phenyl; and a polymer chain fragment; and combinations thereof.

4. The polymerizable composition of claim 1, wherein:

the non-polar olefin is selected from ethylene, a $C_2$-$C_{20}$ acyclic aliphatic olefin, and combinations thereof; and the polar olefin is represented by Formula V

(V)

wherein Z is selected from an aromatic hydrocarbyl group, —OY, —COY and —$CO_2Y$;

where Y is selected from hydrogen and $R^{19}$; where $R^{19}$ is selected from a hydrocarbyl group, an aromatic hydrocarbyl group and derivatives thereof.

5. The polymerizable composition of claim 3, wherein the delocalized free radical according to Formula I is selected from:

galvinoxyl, wherein $R^{23}$ is t-butyl and X is CH; azagalvinoxyl, wherein $R^{23}$ is t-butyl and X is N; and combinations thereof; and the sterically hindered N-oxyl free radical according to Formula II is selected from:

2,2,6,6-tetraalkyl-1-piperidin-N-oxyl free radicals 2,6-dialkyl-2,6-diaryl-1-piperidin-N-oxyl free radicals; bis-(alicyclic-N-oxyl)diradicals; 2,2,5,5-tetraalkyl-1-pyrrolidin-N-oxyl free radicals; 2,5-dialkyl-2,5-diaryl-1-pyrrolidin-N-oxyl free; di-alkyl nitroxides; polymer-bound TEMPOs; 2,2,5,5-tetramethyl-3-oxazolidinyloxyl free radical; all-tertiary butyl N oxyl; metal complexes with TEMPOs; and combinations thereof.

6. The polymerizable composition of claim 3, wherein the sterically hindered N-oxyl free radical according to Formula II is selected from 2,2,6,6-tetramethyl-1-piperidin-N-oxyl free radical, 4-oxo-2,2,6,6-tetramethyl-1-piperidin-N-oxyl free radical, 4-hydroxy-2,2,6,6-tetramethyl-1-piperidin-N-oxyl free radical, 4-phosphonoxy-2,2,6,6-tetramethyl-1-piperidin-N-oxyl free radical, and combinations thereof.

7. The polymerization composition of claim 1, wherein the free radical scavenger is present in an amount of at least 1 ppm and no more than 1,000 ppm, based on the weight of the polar monomer.

8. A method of forming the linear poly[(non-polar olefin)-(polar olefin)] of claim 1, comprising the steps of:

A. forming the polymerizable composition of claim 1 by combining:
i. the catalytic composition comprising an organometallic complex;
ii. the non-polar olefin;
iii. the polar olefin; and
iv. the free radical scavenger, wherein the organometallic complex comprises a metal center, M, complexed with at least one ligand, wherein the at least one ligand has a structure according to Formula (III)

(III)

wherein M is selected from Ni and Pd;

wherein $X^1$, $X^2$ and $X^3$ are independently selected from a hydrocarbyl group, an aromatic hydrocarbyl group and derivatives thereof;

wherein Q is selected from phosphorus and arsenic; and wherein $R^{15}$ is selected from —$SO_3$, —$PO_3$, —$AsO_3$, and —$C(CF_3)_2O$;

wherein the catalytic composition is a catalytic composition that produces, by coordination addition polymerization of the non-polar olefin monomer and the polar monomer, a linear poly[(non-polar olefin)-(polar olefin)] comprising, as polymerized units, the non-polar olefin and the polar olefin; and wherein the free radical scavenger is present in an amount sufficient to suppress the formation of a free radical polymer such that the amount of the free radical polymer formed is 0.0 percent by weight to no more than 1.0 percent by weight, based on the weight of the linear poly[(non-polar olefin)-(polar olefin)]; and B. polymerizing the non-polar olefin and the polar olefin to form a polymerized composition comprising the linear poly[(non-polar olefin)-(polar olefin)] having a branch content of at least 0.0 to no more than 15 branches/1,000 carbon atoms, as determined by Carbon 13 NMR, wherein the polymerized composition comprises free radical addition polymer in an amount of from 0.0 to no more than 1.0 percent by weight based on the weight of the linear poly[(non-polar olefin)-(polar olefin)].

9. The method of claim 7, wherein the linear poly[(non-polar olefin)-(polar olefin)] has a number average molecular weight, $M_n$, which is at least 5,000 g/mole and no more than 5,000,000 g/mole.

10. A polymerized composition comprising:
A. a linear poly[(non-polar olefin)-(polar olefin)] comprising, as polymerized units, a non-polar olefin and a polar olefin;
B. a catalytic composition comprising an organometallic complex;
  wherein the organometallic complex comprises a metal center, M, complexed with at least one ligand, wherein the at least one ligand has a structure according to Formula (III)

wherein M is selected from Ni and Pd;
wherein $X^1$, $X^2$ and $X^3$ are independently selected from a hydrocarbyl group, an aromatic hydrocarbyl group and derivatives thereof;
wherein Q is selected from phosphorus and arsenic; and
wherein $R^{15}$ is selected from —$SO_3$, —$PO_3$, —$AsO_3$, and —$C(CF_3)_2O$;

C. a free radical scavenger,
  wherein the polymerized composition comprises a free radical addition polymer in an amount of 0.0 percent by weight to no more than 1.0 percent by weight, based on the weight of the linear poly[(non-polar olefin)-(polar olefin)];
  wherein the catalytic composition is a catalytic composition that produces, by coordination addition polymerization of the non-polar monomer and the polar monomer, a linear poly[(non-polar olefin)-(polar olefin)] comprising, as polymerized units, the non-polar olefin monomer and the polar monomer; and
  wherein the linear poly[(non-polar olefin)-(polar olefin)] has a branch content of 0.0 to no more than 15 branches/1,000 carbon atoms, as determined by Carbon 13 NMR.

* * * * *